(12) United States Patent
Livesey (10) Patent No.: US 9,572,449 B2
(45) Date of Patent: Feb. 21, 2017

(54) FOLDING/COLLAPSIBLE COOKWARE

(71) Applicant: Jeff Livesey, Madison, WI (US)

(72) Inventor: Jeff Livesey, Madison, WI (US)

(73) Assignee: Flexware, LLC, Madison, WI (US)

( * ) Notice: Subject to any disclaimer, the term of this patent is extended or adjusted under 35 U.S.C. 154(b) by 0 days.

(21) Appl. No.: 14/727,932

(22) Filed: Jun. 2, 2015

(65) Prior Publication Data

US 2016/0058229 A1 Mar. 3, 2016

Related U.S. Application Data

(60) Provisional application No. 62/045,161, filed on Sep. 3, 2014.

(51) Int. Cl.
| | | |
|---|---|---|
| *A47J 37/10* | (2006.01) | |
| *A47J 27/00* | (2006.01) | |
| *A47J 36/04* | (2006.01) | |
| *A47J 36/02* | (2006.01) | |
| *A47J 45/06* | (2006.01) | |

(52) U.S. Cl.
CPC ............... *A47J 27/002* (2013.01); *A47J 36/02* (2013.01); *A47J 36/04* (2013.01); *A47J 45/061* (2013.01)

(58) Field of Classification Search
CPC ........... A47J 37/10; A47J 36/02; A47J 27/002
USPC ......................................... 220/573.1, 756, 6
See application file for complete search history.

(56) References Cited

U.S. PATENT DOCUMENTS

| | | | | |
|---|---|---|---|---|
| 924,336 | A * | 6/1909 | French | A47J 37/10 99/424 |
| 2,436,566 | A * | 2/1948 | Goldberg | A47J 27/092 137/532 |
| 4,940,867 | A * | 7/1990 | Peleg | B65D 81/3453 219/730 |
| 6,684,760 | B1 * | 2/2004 | Rajusth | A21B 3/13 220/574 |
| 2003/0126996 | A1 * | 7/2003 | Cheng | A47J 27/002 99/422 |
| 2008/0175959 | A1 * | 7/2008 | Hill | A23L 1/0005 426/90 |
| 2010/0112145 | A1 * | 5/2010 | Nilsson | B65D 81/3453 426/107 |
| 2011/0146502 | A1 * | 6/2011 | Mansur | A21B 3/131 99/426 |
| 2014/0190975 | A1 * | 7/2014 | Roylance | F24C 15/16 220/573.1 |

* cited by examiner

*Primary Examiner* — Stephen Castellano
(74) *Attorney, Agent, or Firm* — Joseph T. Leone, Esq.; DeWitt Ross & Stevens S.C.

(57) ABSTRACT

Foldable/collapsible cookware is shown having a flexible cooking layer, attached in face-to-face orientation with a heat-heat receiving layer having at least two parts. The first and second parts of the heat-receiving surface are movable between a first cooking position in which the flexible cooking layer is substantially unbent, and a second storage position in which the flexible cooking layer is substantially bent upon itself.

2 Claims, 10 Drawing Sheets

FOLDING/COLLAPSIBLE COOKWARE

CROSS-REFERENCE TO RELATED APPLICATIONS

Priority is hereby claimed to provisional application Ser. No. 62/045,161, filed Sep. 3, 2014, which is incorporated herein by reference.

FIELD OF THE INVENTION

Disclosed herein is foldable and otherwise collapsible cookware that allows for compact storage and easy transport, yet can be used to cook food over an open flame heat source such as a gas range.

BACKGROUND

Cookware, of course, is used to hold and apply heat to food during preparation of the food. Exemplary pieces of cookware include stock pots, woks, frying pans and the like. As used herein, the word "cookware" refers generically to any of these and similar types of cookware. Although cookware comes in many different shapes and sizes, all cookware includes two basic elements: a first surface for receiving thermal energy from a heat source, i.e., the "heat-receiving surface," and a second surface for applying the heat to raw food to be cooked, i.e., the "cooking surface." In the case of conventional cookware, the heat-receiving surface and the cooking surface are the two opposing faces of a monolithic or laminar sheet of heat-transfer material—typically steel, copper, copper-coated steel, aluminum, these materials with the cooking surface further coated with an non-stick material, and the like.

Cooking itself is a straightforward process and well known. In a typical process for cooking food, a piece of cookware holding the raw food to be cooked (or the raw food plus a liquid medium, such as water or cooking oil) is placed on a gas range having a burner. When ignited, the burner produces a flame that rises up in response to the pressure of the gas in the range's supply piping. The buoyancy of the hot air causes the flame to touch the heat-receiving surface of the cookware—i.e., the bottom of the pan. Thermal energy is transferred from the flame to the heat-receiving surface of the cookware via convection as well as thermal radiation. Thus, the heat-receiving surface absorbs the thermal energy from the burning gas from the range. Thermal conduction then transfers the thermal energy from the heat-receiving surface to the cooking surface of the cookware. The rate and efficiency of the heat transfer is a function of the material from which the cookware is made (for example, steel vs. copper vs. aluminum). The cooking surface of the cookware then transfers thermal energy to the food to be cooked via conduction and convection.

The efficiency and rate at which the heat is transferred from the heat-receiving surface to the cooking surface for any given piece of cookware is dictated in major part by the heat capacity and the specific heat of the material from which the cookware is made. These two measures are sometimes confused: Heat capacity is the ratio of the amount of energy absorbed by the material to the associated temperature rise of the material (that is, energy input/temperature rise, for example Joules/Kelvin). Thus, materials having a low heat capacity are desired for cookware because a small amount of input energy yields a larger associated temperature rise. Specific heat is the heat capacity of a material per unit of mass (energy input/(temperature)(mass), for example, Joules/(gram)(Kelvin)). Again, materials having relatively low specific heats are desirable for cookware because they transfer heat efficiently. Because metals have very low heat capacity and specific heat, they are conventionally used for cookware. For example, iron has a specific heat of 0.444 J/g° C. The specific heat of aluminum is 0.900 J/g° C.; the specific heat of copper is 0.385 J/g° C. The low specific heat of copper thus makes it desirable as a cookware material.

A drawback, of course, is that metals are heavy. Thus, while cast iron skillets and Dutch ovens are well known for their desirable cooking characteristics, cast iron cookware is very, very heavy. Aluminum gives the benefit of lighter weight, but lower thermal efficiency. Whatever metal is chosen, cookware tends to be bulky and difficult to store. Thus, there remains a long-felt and unmet need for cookware that is both thermally efficient and easy to store.

BRIEF DESCRIPTION OF THE FIGURES

Throughout all of the figures, the same reference numerals are used to identify the same structures.

DETAILED DESCRIPTION

Figure 1:
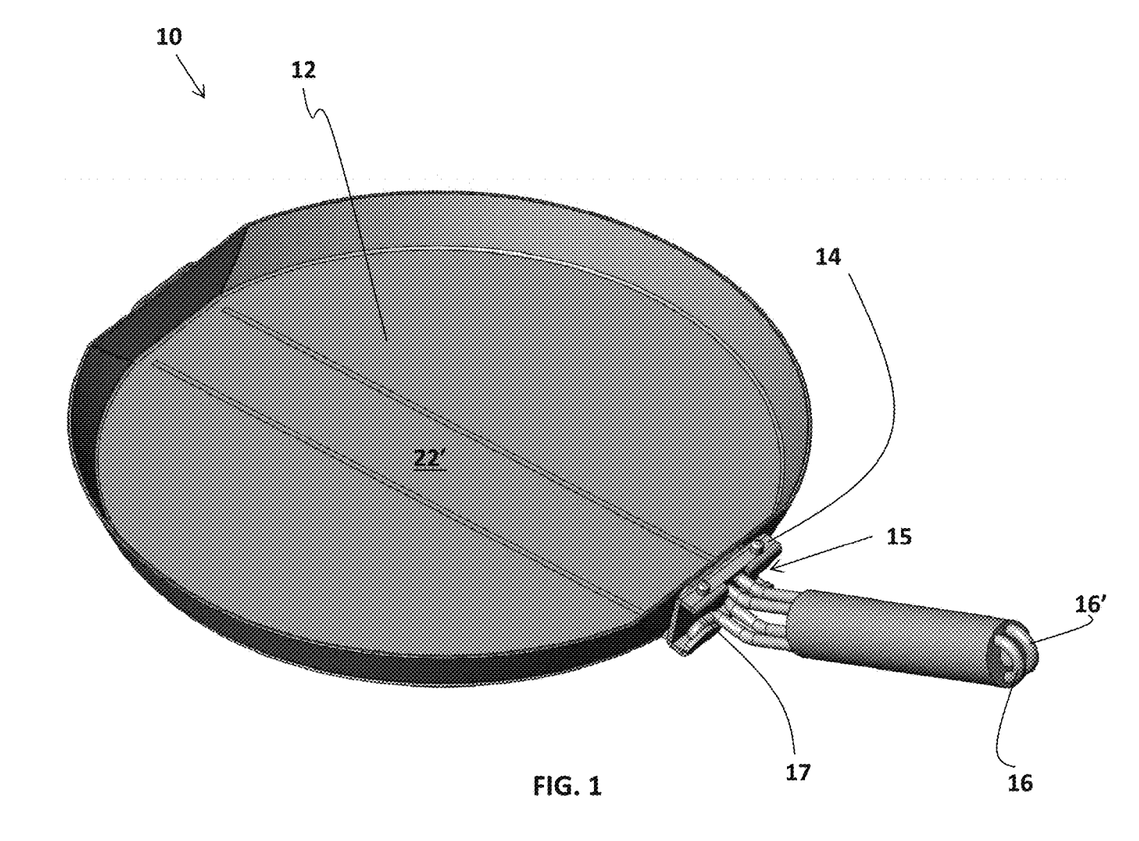
FIG. 1 is a top perspective rendering of the foldable/collapsible cookware disclosed herein in the deployed, cooking position.
Figure 2:
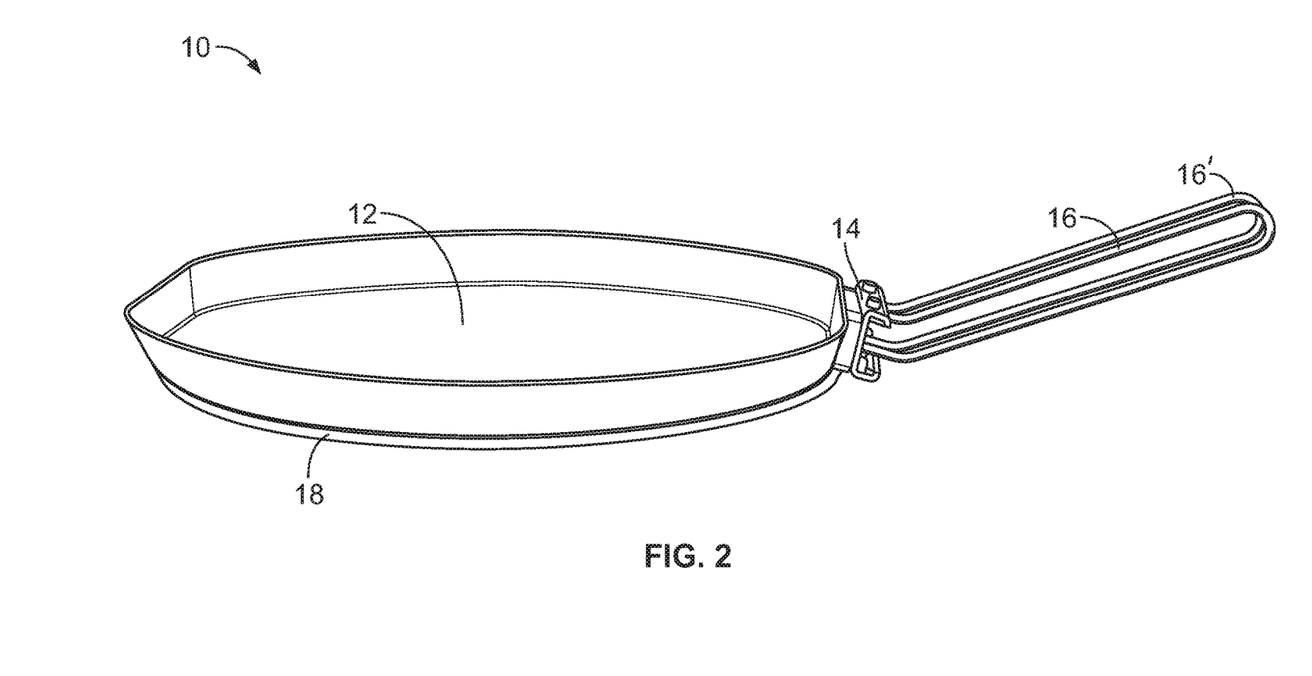
FIG. 2 is a front perspective rendering of the foldable/collapsible cookware in the deployed, cooking position.

Referring to FIGS. 1 and 2, depicted is foldable/collapsible cookware 10. The cookware includes a flexible cooking layer 12 and an optional, two-part, folding handle comprising handle members 16 and 16'. In one version of the cookware, the optional handle members 16 and 16' (if present) are fixed (permanently or reversibly) to the flexible cooking layer 12 via a mounting bracket 14. The mounting bracket 14 is attached to a center section 22, described in detail below. (See FIGS. 4 and 5.) As depicted in FIG. 1, the mounting bracket 14 defines a channel 15. Flanges 17 on the handle members 16 and 16' are structured to engage within the channel 15 in mounting bracket 14, thereby rotatably attaching the handle members to the mounting bracket 14.

Referring now to all of the drawing figures, the flexible cooking layer 12 is fabricated from any suitable, heat-resistant material. The material must be sufficiently flexible that it can be folded upon itself in the fashion depicted in FIGS. 4, 5, and 6. The preferred material for the cooking layer 12 is heat-resistant silicone that has been cast or otherwise formed into the desired shape. As shown in the figures, the cooking layer 12 is formed into the shape of a skillet or frying pan—i.e., generally round with a low, sloping perimeter wall extending upward that allows easy access to the food within. This shape is exemplary, well known, and not limiting or exclusive. The cookware disclosed herein may take the shape of any type of conventional, well known cookware such as a stock pot, casserole, wok, sauté pan, etc., in any suitable shape (for example, round, square, rectangular, oval, etc.) Heat-resistant silicone sheet material is commercially available from several national and international suppliers, including Thunder Technologies LLC (Rochester Hills, Mich., USA), Dow Corning (Midland, Mich., USA), Softcare Silicone UK Limited (Leeds, West Yorkshire, England), and many others.

Now referring specifically to FIGS. 2 and 4-6, the cookware also includes a three-part heat-receiving layer. The heat-receiving layer comprises a central heat-receiving layer 22 to which are attached, in wing-like fashion, layers 18 and 18'. The wing-like heat-receiving layers 18 and 18' serve a two-fold purpose. First, they function to give the cookware rigidity when in the deployed, cooking position. Second, they function to transfer heat from the chosen heat source to the flexible cooking layer 12. The central heat-receiving layer 22 also serves these purposes, as well as providing a firm surface on which to mount bracket 14. The bracket 14 may be mounted to the central heat-receiving layer 22 by any conventional means (permanent or reversible), such as nut and bolts, screws, rivets, welding, high-temperature adhesive, and the like. All three heat-receiving layers 18, 18' and 22 are preferably made from those metals or glass conventionally used in the fabrication of cookware. Examples of such materials include, but are not limited to, aluminum, steel (e.g., stainless steels, carbon steels, alloy steels, and the like), iron (e.g., cast iron), brass, copper, glass, ceramic and "PYREX"-brand glasses. ("Pyrex" is a registered trademark of Corning Incorporated, Corning, N.Y., USA.)

Figure 3:
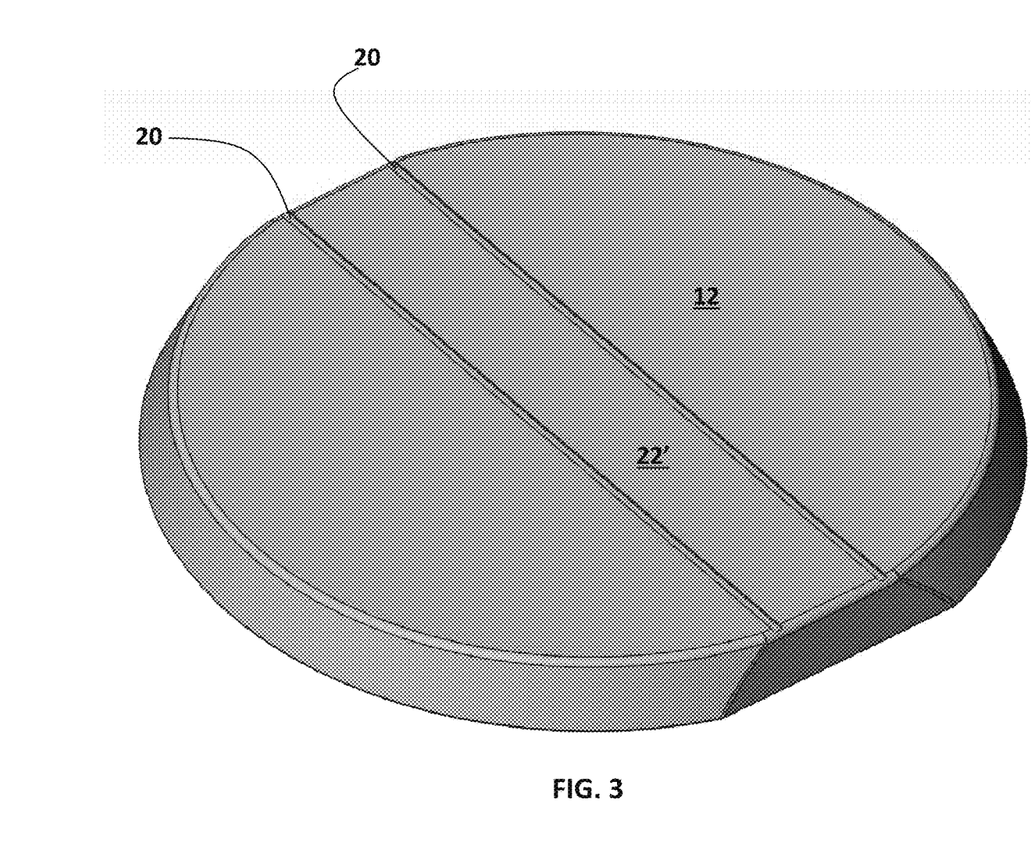
FIG. 3 is a bottom perspective rendering of the flexible, cooking layer of the cookware, in isolation (i.e., removed from the heat-receiving layer).
Figure 4:
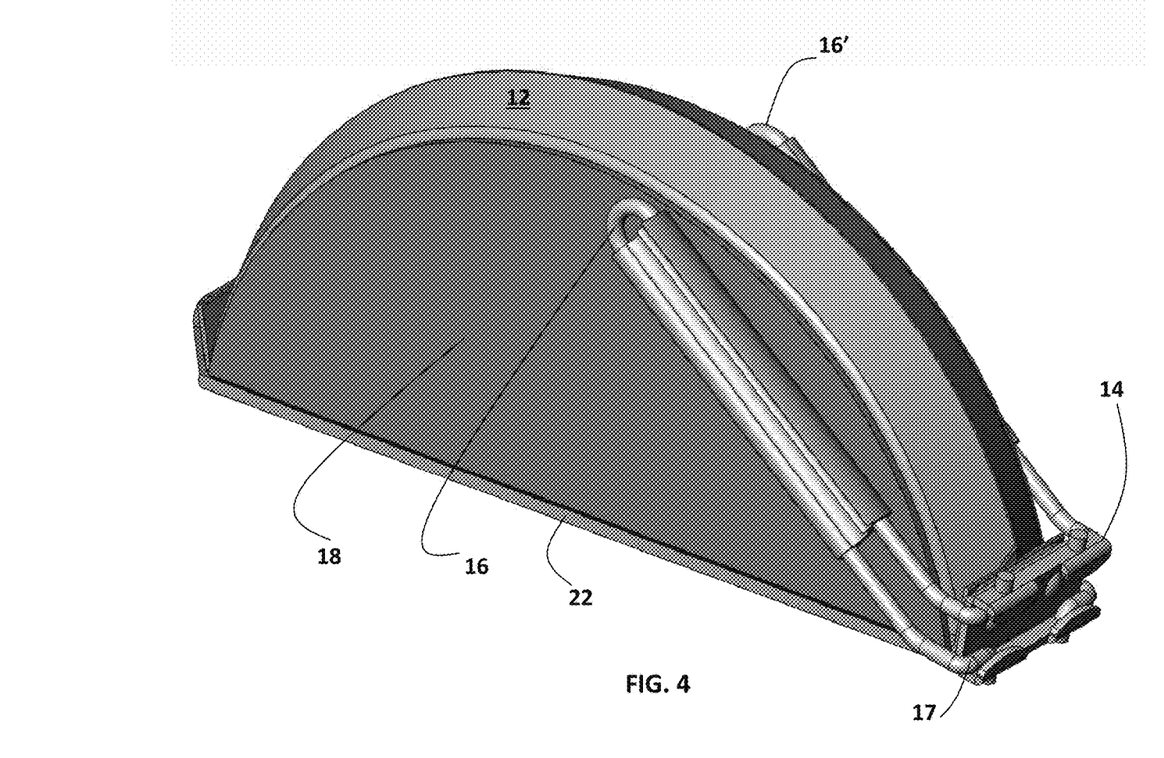
FIG. 4 is a top perspective rendering of the foldable/collapsible cookware in the folded position.
Figure 5:
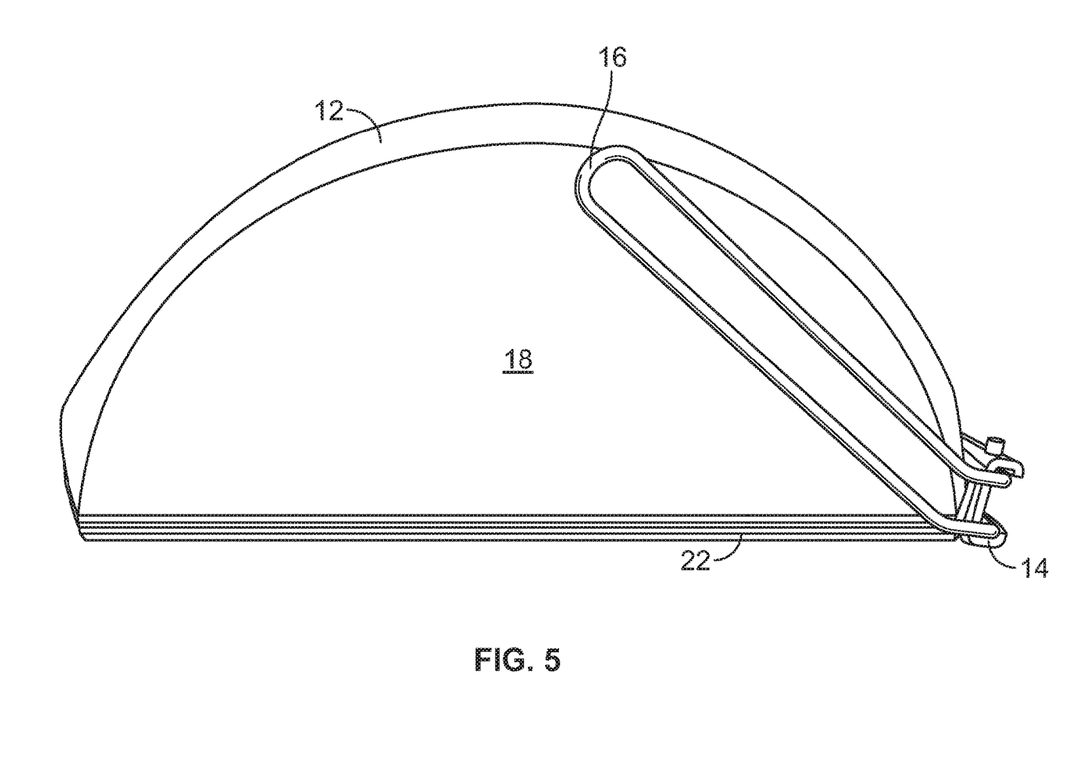
FIG. 5 is a front elevation rendering of the foldable/collapsible cookware in the folded position.
Figure 6:
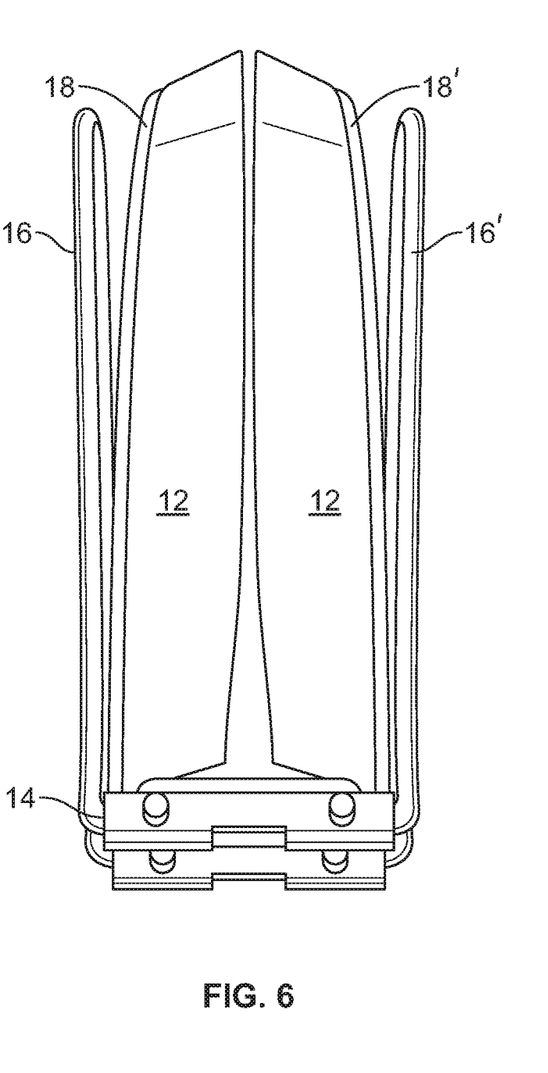
FIG. 6 is a side elevation rendering of the foldable/collapsible cookware in the folded position.

In one version of the cookware, the cooking layer 12 and 22' (see below and FIG. 3) and the heat-receiving layers 18, 18', and 22 are joined together in face-to-face orientation via an adhesive, such as high-temperature resistant glue. As shown in FIG. 3, the flexible cooking layer 12 includes a pair of fold lines or depressions 20 bracketing a central portion 22' of the cooking layer 12 that enable the layer 12 to fold easily and repeatably into a storage position as shown in FIGS. 4, 5 and 6. That is, in one version of the cookware the fold lines 20 act as a living hinges that enable the layers 18 and 18' to rotate smoothly with respect to central layer 22, without bunching or binding of the cooking layer 12 about layer 22' (see FIG. 1). In this version of the cookware, layers 18 and 18' are not directly attached to the central layer 22. Rather, all three of layers 18, 18' and 22 are attached to the cooking layer 12 and fold lines 20 function as hinges to move the layers 18 and 18' from a first cooking position (as shown in FIGS. 1 and 2) to a second storage position (as shown in FIGS. 4, 5, and 6). Alternatively, the layers 18 and 18' may be directly attached to central layer 22 via at least two hinges—at least a first hinge linking layer 18 to layer 22, and at least a second hinge linking layer 18' to layer 22.

In the storage position, which is illustrated in FIGS. 4, 5, and 6, the heat-receiving layers 18 and 18' are folded/collapsed upward, toward one another, sandwiching the cooking layer 12 between layers 18 and 18'. The attached flexible cooking layer 12 is thus folded upon itself. The two handle members 16 and 16' can then be rotated from a first cooking position as shown in FIGS. 1 and 2, to a second storage position in which the handle member 16 is resting against heat-receiving layer 18 and handle member 16' is resting against heat-receiving layer 18'. See FIG. 6, for example. In the storage position, the space occupied by the cookware 10 is very nearly cut in half.

Figure 7:
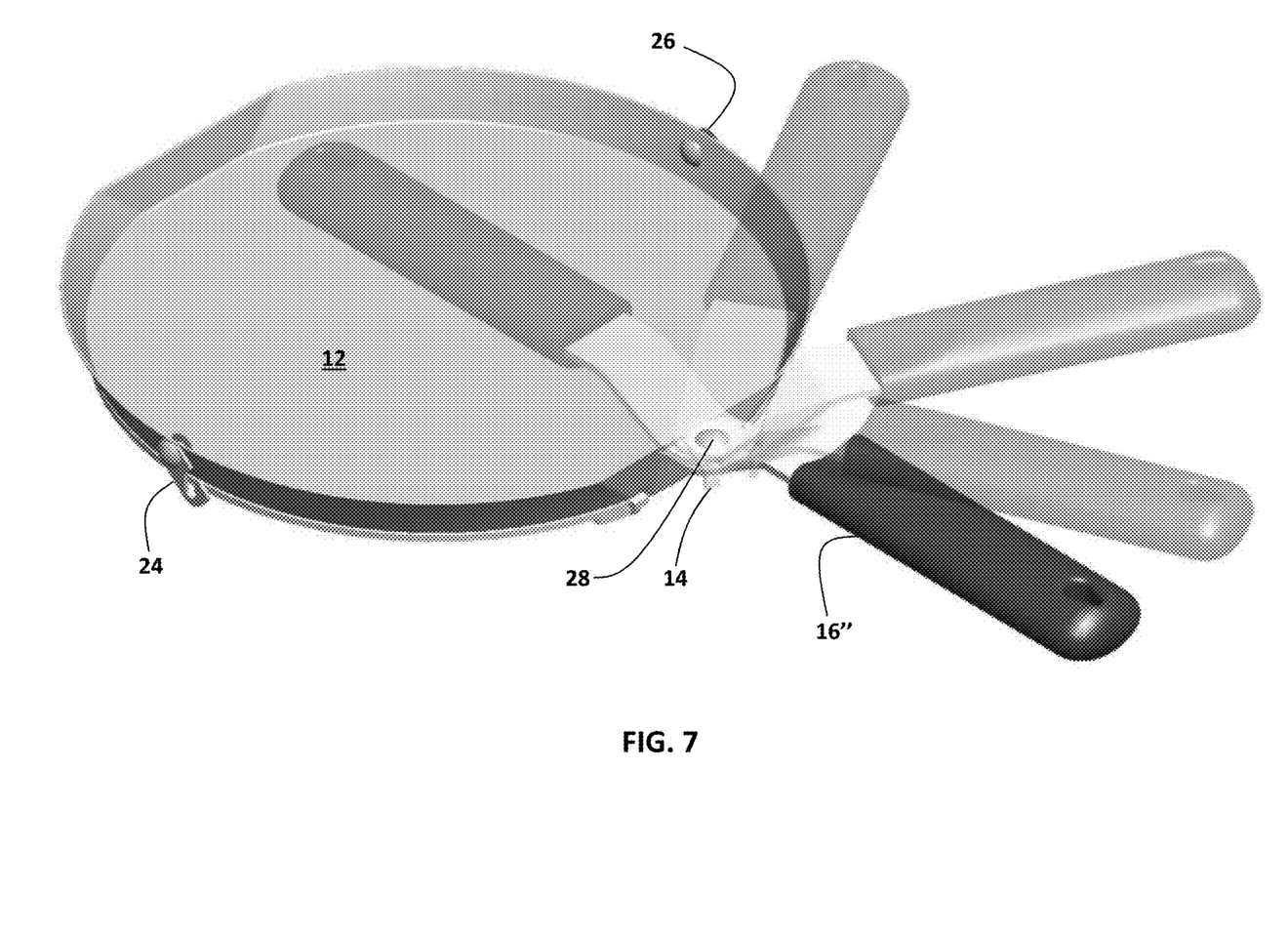
FIG. 7 is a top perspective rendering of another version the foldable/collapsible cookware disclosed herein in the deployed, cooking position.
Figure 8:
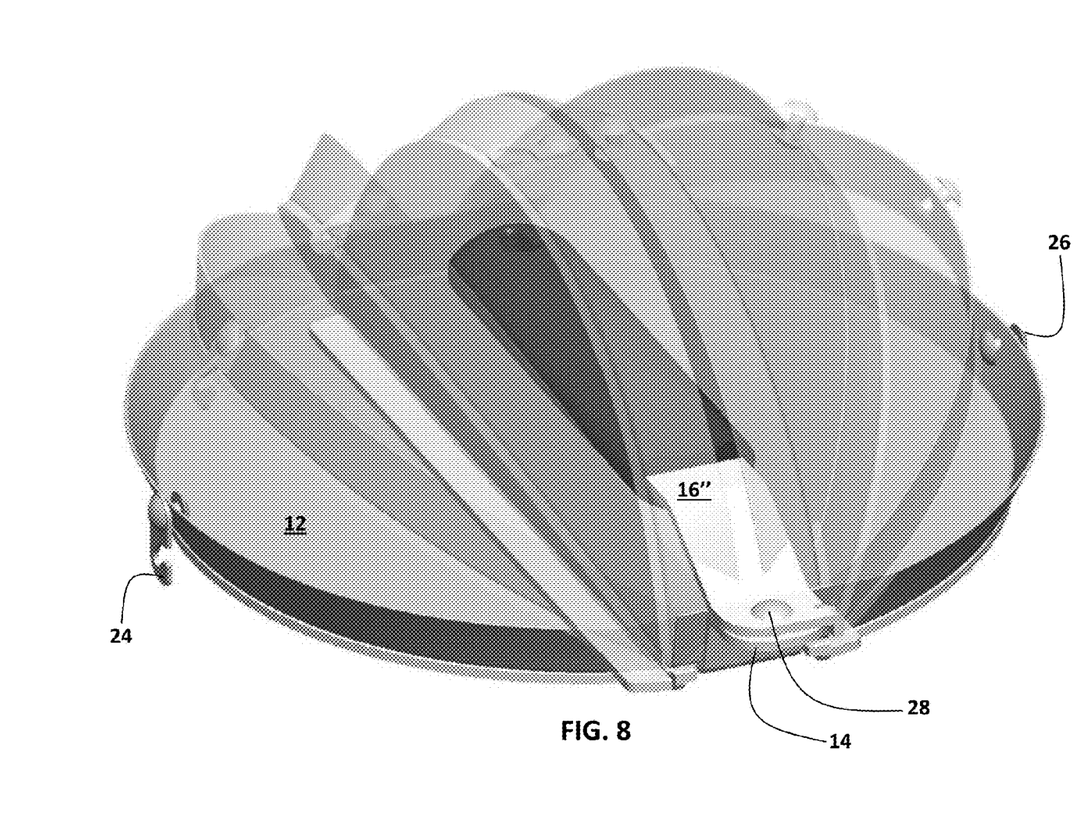
FIG. 8 is a top perspective rendering of the version shown in FIG. 7, in the process of moving from the deployed, cooking position, into the folded or collapsed, storage position.

FIG. 7 depicts another version of the cookware in which handle 16" is a monolithic assembly that is mounted via mounting bracket 14 and fastener 28 to layer 22 of the cookware. (See also FIG. 10.) FIG. 8 shows how the handle 16" is rotatable to the storage position. The cooking layer 12 is then foldable upward as shown in FIG. 8 so that the handle 16" is enveloped by the two wings of the cooking layer. A closing mechanism, 24 and 26 is included to reversibly lock the cookware in the storage position. As shown in FIG. 8, the closing mechanism comprises a simple hook 24 and tab 26. Any suitable closing mechanism, such as a spring-loaded latch, slot-and-tab closure, and the like, may also be used. Mounting bracket 14 is shown, along with fastener 28.

Figure 9:
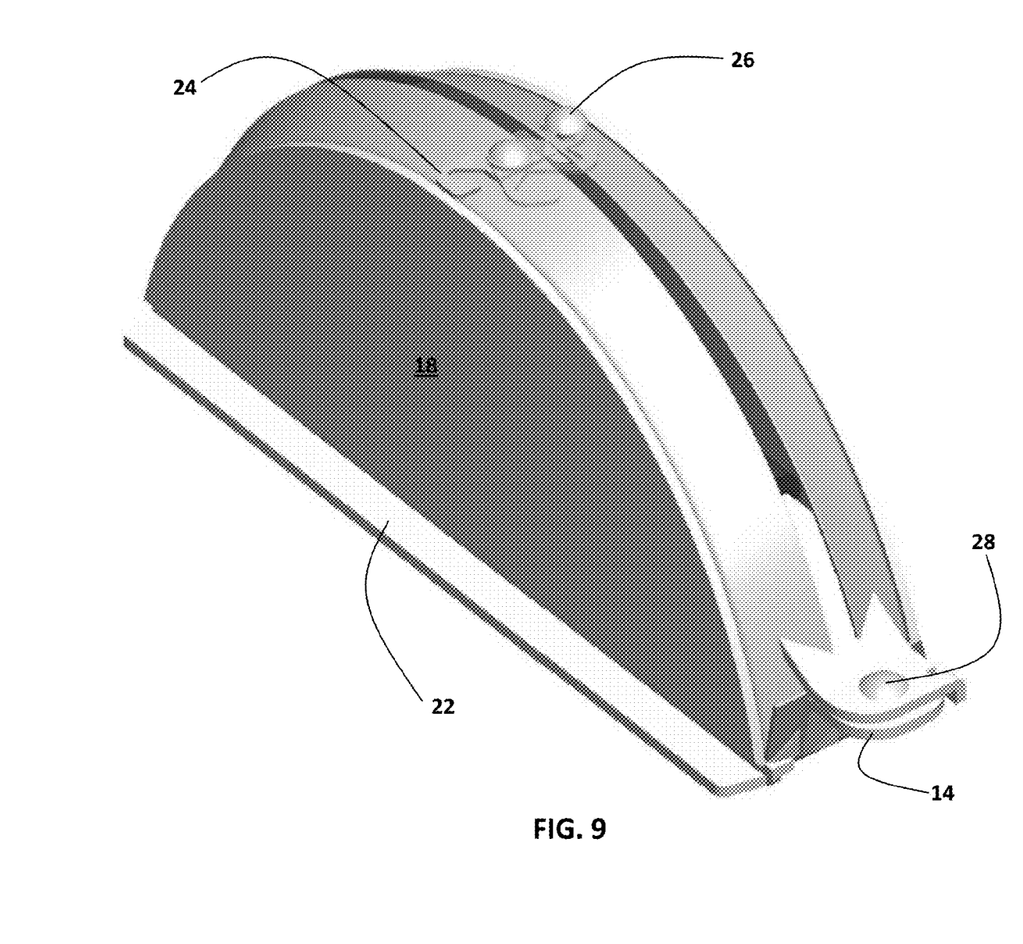
FIG. 9 is a top perspective rendering of the version shown in FIG. 7 in the folded or collapsed position.

FIG. 9 shows the version of the cookware as shown in FIG. 7, but in the closed, storage position. The handle 16" has been rotated into the interior, and thus is not visible (except for the end that attaches to the mounting bracket 14 via fastener 28. layer 22 is visible, as is one of the heat-receiving layers 18. The other heat-receiving layer, 18', is hidden from view in FIG. 9. The closing mechanism, 24 and 26, is shown in shadow in both the latched position and unlatched position.

Figure 10:
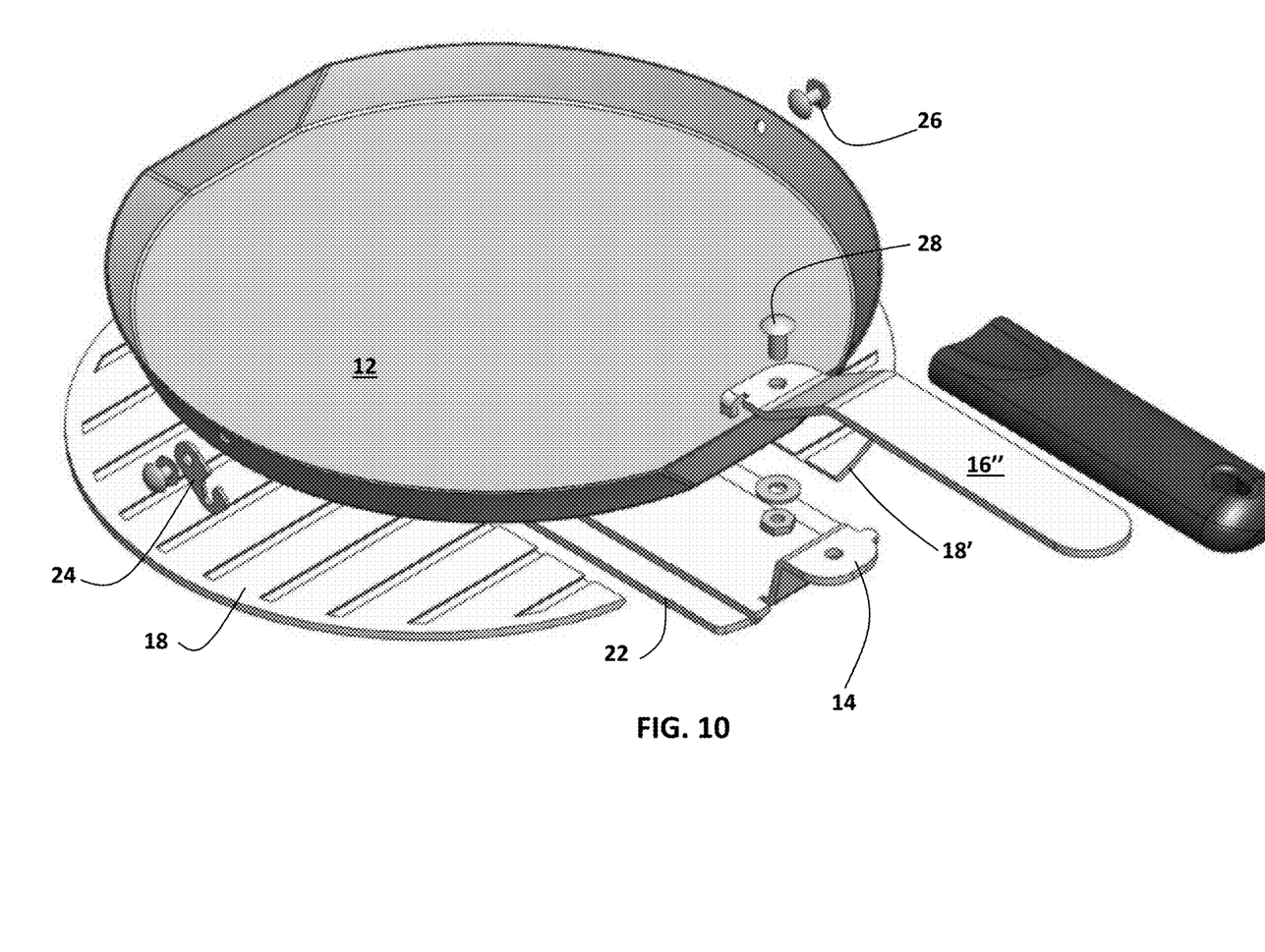
FIG. 10 is a top perspective, exploded rendering of the version of the foldable/collapsible cookware depicted in FIG. 7.

FIG. 10 shows the version of the cookware as shown in FIG. 7, but in exploded view. As disclosed earlier, the cooking layer 12 attaches to heat-receiving layers 18 and 18', as well as central layer 22. Heat-receiving layers 18 and 18' are attached in wing-like fashion to the central layer 22 and are movable between the cooking position (as shown in FIG. 10) and the storage position (as shown in FIG. 9). The handle 16" attaches to the mounting bracket 14 via fastener 28, and is movable between the cooking position (as shown in FIG. 10) the storage position (as shown in FIG. 9). The closing mechanism, 24 and 26, is shown detached from the cooking layer 12. As shown in FIG. 10, the closing mechanism, 24 and 26, attaches in rivet-like fashion to mating apertures in the sides of the cooking layer 12.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All references to singular characteristics or limitations of the present invention shall include the corresponding plural characteristic or limitation, and vice-versa, unless otherwise specified or clearly implied to the contrary by the context in which the reference is made. The indefinite articles "a" and "an" mean "one or more" unless clearly stated otherwise.

The cookware disclosed herein may can comprise, consist of, or consist essentially of the essential elements and limitations of disclosed herein, as well as any additional or optional components, structures, or limitations known in the art of cookware.

What is claimed is:

1. Cookware comprising:
   a flexible cooking layer comprising heat-resistant silicone;

a heat-receiving layer comprising a first part, second part, and a third part, wherein the third part is disposed between the first and second parts, and wherein the first, second, and third parts of the heat-receiving layer comprise a metal selected from the group consisting of steel, cast iron, aluminum, copper, or combinations or layers thereof;

wherein the first, second, and third parts of the heat-receiving layer are attached in face-to-face orientation with the flexible cooking layer such that the first and second parts are movable between a first cooking position in which the flexible cooking layer is substantially unbent, and a second storage position in which the flexible cooking layer is substantially bent upon itself;

a handle attached to the third part of the heat-receiving layer.

2. The cookware of claim 1, wherein the handle comprises two handle members, each of which is movable between a first cooking position in which each member extends substantially outward from the flexible cooking layer, and a second storage position in which each handle member contacts one of the first or second parts of the heat-receiving layer.

* * * * *